Aug. 30, 1966    W. R. SMITH    3,269,100
HEIGHT ADJUSTMENT MECHANISM FOR LAWN MOWERS
Filed July 15, 1964    4 Sheets-Sheet 1

INVENTOR.
WILLIAM R. SMITH
BY
Browne, Schuyler & Beveridge
ATTORNEYS

Aug. 30, 1966 W. R. SMITH 3,269,100
HEIGHT ADJUSTMENT MECHANISM FOR LAWN MOWERS
Filed July 15, 1964 4 Sheets-Sheet 2
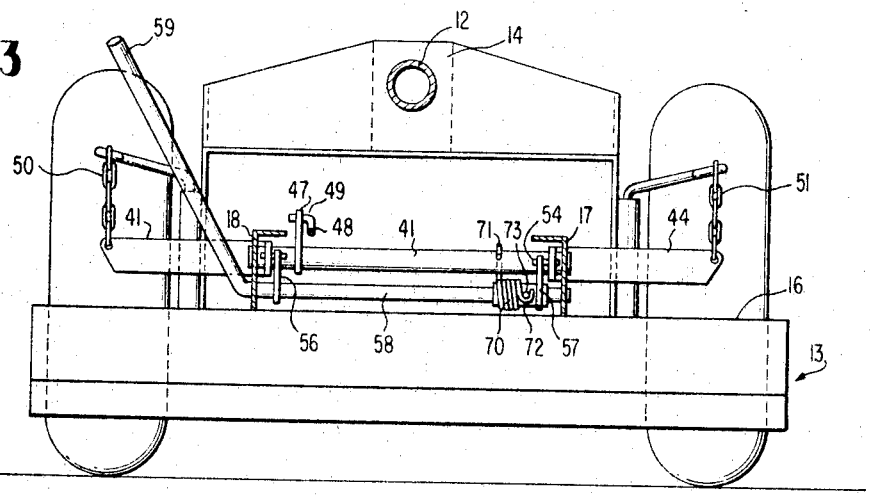
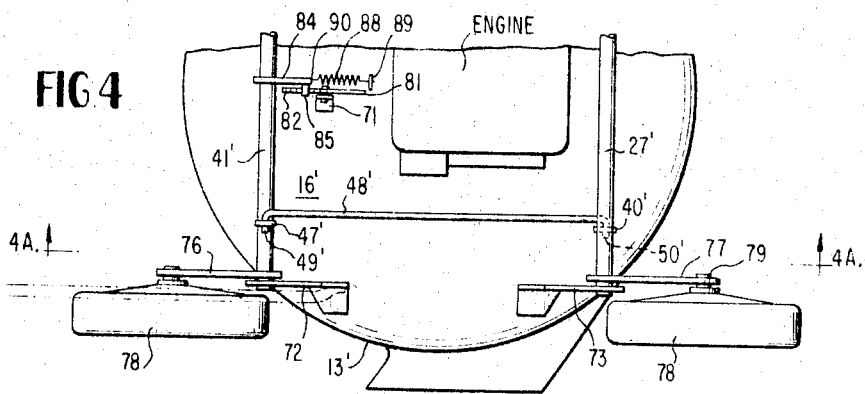
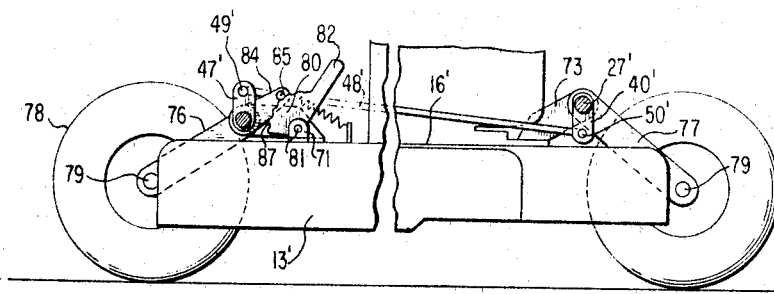
INVENTOR
WILLIAM R. SMITH
BY *Browne, Schuyler & Beveridge*
ATTORNEYS Aug. 30, 1966 W. R. SMITH 3,269,100
HEIGHT ADJUSTMENT MECHANISM FOR LAWN MOWERS
Filed July 15, 1964 4 Sheets-Sheet 3

INVENTOR.
WILLIAM R. SMITH
BY
Browne, Schuyler & Beveridge
ATTORNEYS

Aug. 30, 1966   W. R. SMITH   3,269,100
HEIGHT ADJUSTMENT MECHANISM FOR LAWN MOWERS
Filed July 15, 1964   4 Sheets-Sheet 4

INVENTOR
WILLIAM R. SMITH

BY *Browne, Schuyler & Beveridge*
ATTORNEYS

# United States Patent Office 3,269,100
Patented August 30, 1966

3,269,100
HEIGHT ADJUSTMENT MECHANISM FOR LAWN MOWERS
William R. Smith, McDonough, Ga., assignor to McDonough Power Equipment, Inc., McDonough, Ga., a corporation of Georgia
Filed July 15, 1964, Ser. No. 382,861
6 Claims. (Cl. 56—25.4)

This invention relates to a height adjustment mechanism for lawn mowers, and more specifically, to a height adjustment mechanism which is quick acting and applicable to numerous types of lawn mowing equipment. In its most basic aspects, the invention is disclosed in my application Serial No. 234,468, filed October 31, 1962, now Patent 3,154,902, and this application is a continuation-in-part thereof.

It is known to adjust the cutting height of a rotary mowing unit, for example, by the use of cranks pivotally mounted at the forward and rearward ends of the cutter unit on which are mounted wheels or other ground engaging elements, and linkage means may interconnect the forward and rearward cranks. A lever on a further arm of one of the bell cranks is associated with a latching arm which engages a toothed quadrant. To adjust the cutting height, the latch is released and the arm is moved to different positions and locked with teeth on the quadrant. Obviously, this requires the operator to release the latch before the cutting height of the cutter unit can be adjusted to a new position.

In other known latching arrangements a stepped stop lever is manually positioned in interference relationship with an extended operating arm of the bell crank.

A common feature of all such prior art arrangement is that in essence they require at least two and usually three maneuvers on the part of the user to change the cutting height of the cutter unit. Where the ground wheels supporting the cutter unit are part of a linkage system having a single operating handle, for example, the user is required to (1) disengage the latch, (2) move the operating handle to the desired position and then (3) re-engage the latch (while it is true that most such latches are spring operated and the re-engagement is effected by the spring, there is still a third maneuver, namely, (3a) the user must hold the latch disengaged while the adjustment is made). Where a similar scheme is used on the wheels of a mower guided by a walking attendant, this same schedule of maneuvers must be performed and, if the ground wheels are not interconnected by a linkage, the number of maneuvers is multiplied by the number of wheels on the mower unit.

A very common type of height adjustment mechanism utilizes bell crank levers pivotally mounted at the four sides of the mower unit. One arm of the bell crank carries the wheel while the other arm, the latching arm, cooperates with a fixed toothed quadrant to hold the cutter unit at a given height of cut. Since it is desirable for the wheels to be rearward of the pivoted mounting of the bell crank, the weight of the mower unit acts in opposition to the latching arm to tend to rotate the latching arm in an opposite direction. Thus, the user must usually lift one edge of the mower unit, make the adjustment, and this must be done at all four wheels. Obviously, this adjustment cannot be done when the cutter blade is rotating.

One of the main problems with which the present invention is concerned is the enablement of adjustments or change of height of the cutter unit with respect to the ground surface over which the cutter unit travels which may be made safely, quickly, and easily, and primarily wherein the adjusted height of the cutter unit is effectively maintained without requiring excessive structure. This problem was solved effectively by cutter unit height adjustment structure according to the present invention which can be safely and easily actuated even during normal operation, and where the weight of the cutter unit acts constantly to maintain the given height adjustment. Thus, an object of the present invention is to provide a powered lawn mowing implement in which the height of the cutting unit above the ground surface may be safely, quickly and easily adjusted. Another object of the present invention is to provide an improved height adjust mechanism for rotary lawn mowers.

In its preferred form, the invention features an eccentric cam having a scalloped camming surface and a stud or other element engagable with a scallop of the cam to adjust the cutter unit relative to its ground engaging elements. The cam may be pivotally mounted on the cutter unit. Alternatively, the cam may be pivotally mounted on a moving part of the ground engaging structure. Each scallop on the cam is at a different effective radii from the pivotal axis of the cam and an actuating handle of lever rigid with the cam is utilized to rotate the cam to different angular positions so as to bring different radii (e.g. scallop) into play. The cam itself cams the movable member, or itself, into different positions of adjustment to thus adjust the height of the cutter unit above ground.

A most important aspect of the invention is that the cam is so arranged and connected to the cutter unit so that the weight of the cutter unit itself is effectively utilized to bias or urge the camming surface and a cooperating cam pin into engagement. Thus, all prior latching arrangements utilized heretofore in power mower equipment are eliminated and there is no need at all to "unlatch" the cam. In certain instances it is desirable to utilize friction and/or spring means to avoid inadvertent shifting of the cam or associated components of the ground engaging elements. The weight of the cutter unit is multiplied through a force multiplying arrangement to effectively maintain the cam in a given adjustment position. At the same time, the cam is so arranged relative to its operating handle that a force multiplying effect is utilized to raise the cutter unit. In lowering the cutter unit, the weight of the cutter unit is itself effective, through gravity, to reduce the amount of force required.

The above and other features, objects and advantages of the invention will become apparent from the consideration of the following specification, taken in conjunction with the accompanying drawings wherein:

FIG. 3 is a cross-sectional view taken on lines 3—3 of FIG. 1;

FIG. 4 is a partial top plan view of the invention as applied to an attendant-guided lawn mower, while FIG. 4A is a partial cross-sectional view in the direction of the arrows 4A—4A;

Figure 7:
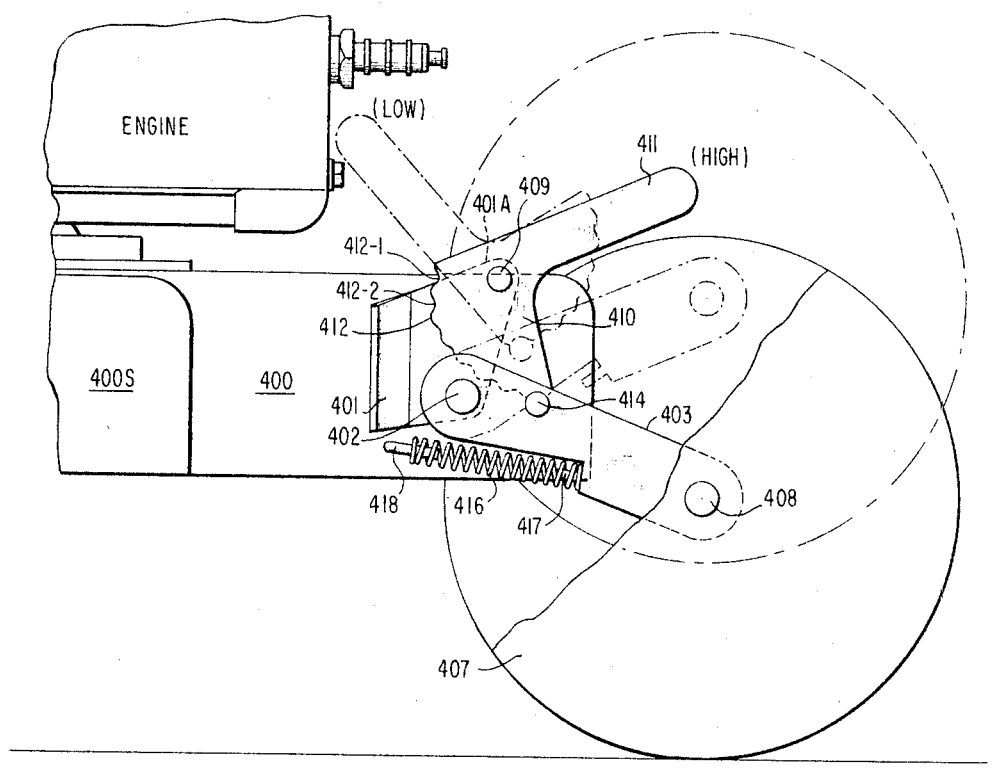
Figure 8:
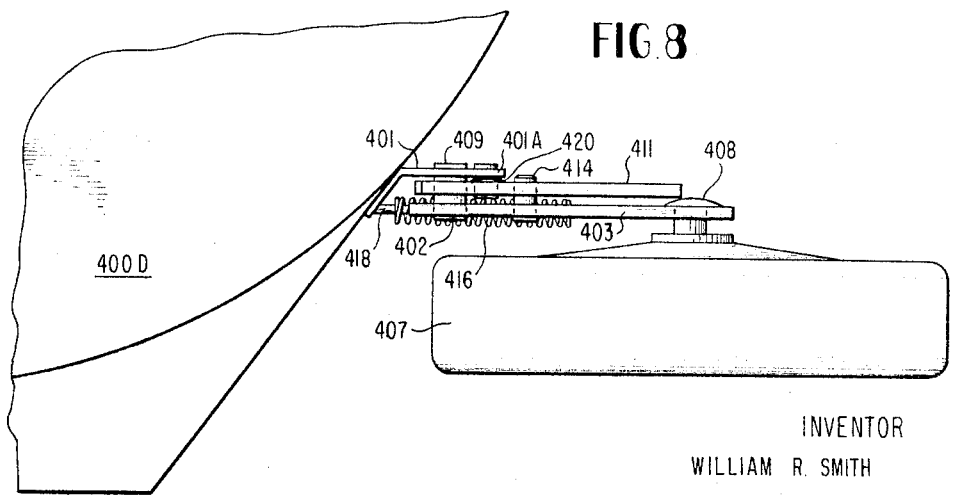

FIG. 7 discloses a further modification of the invention as applied to a push-type lawn mower; and FIG. 8 is a partial top plan view of the mechanism shown in FIG. 7.

Figure 1:
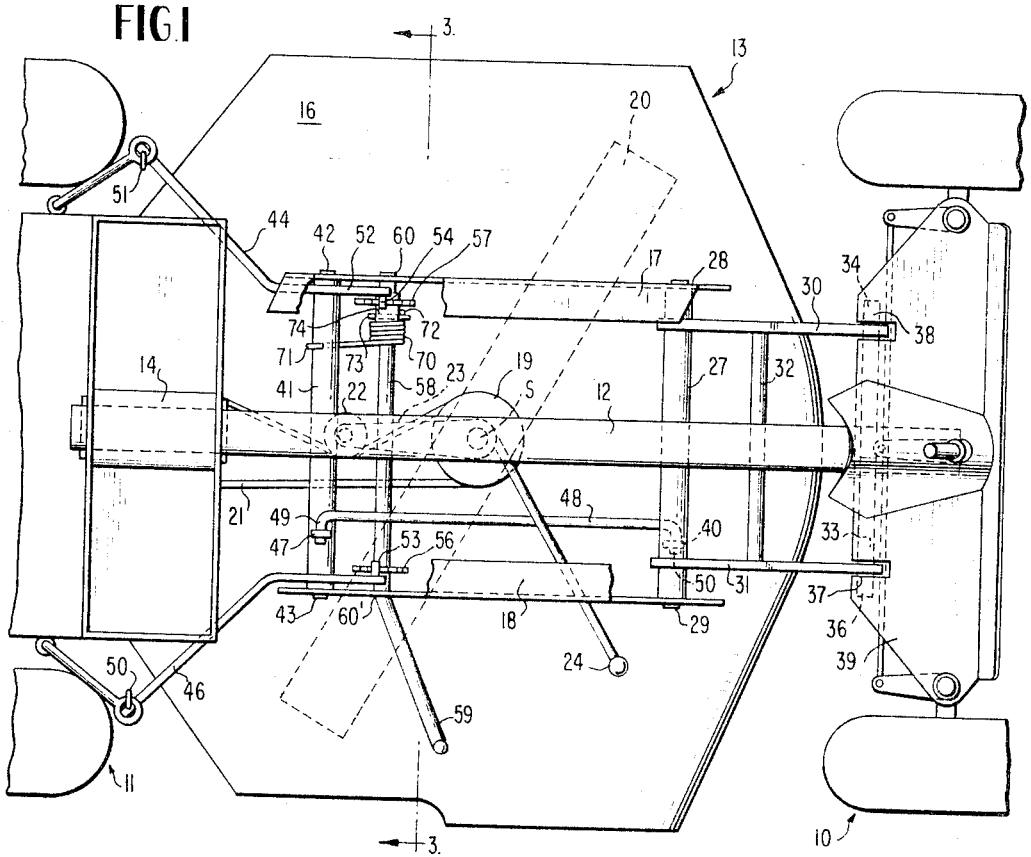
FIG. 1 is a partial top plan view showing the invention as it is applied to a rotary cutter unit suspended from a riding tractor and is substantially similar to FIG. 2 of my application Serial No. 234,468, filed October 31, 1962.
Figure 2:
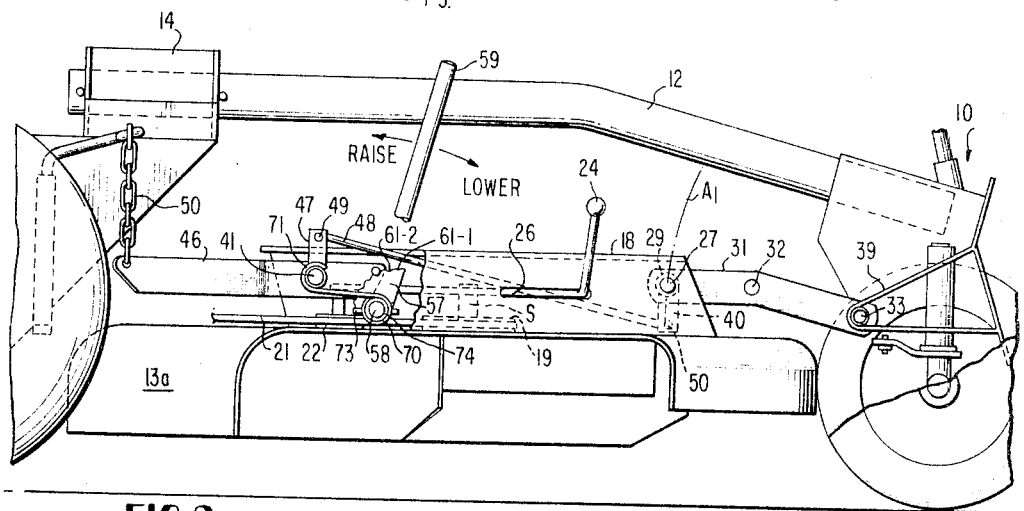
FIG. 2 is a partial side elevational view of the mechanism shown in FIG. 1 and is substantially similar to FIG. 3 of my application Serial No. 234,468, filed October 31, 1962.

FIGS. 1 and 2, which are substantially identical to FIGS. 2 and 3 of my aforementioned application Serial No. 234,468, disclose my quick height adjacent mechanism as applied to a riding tractor. Forward wheel steering unit 10 is connected with rear wheel traction unit 11 by a longitudinal frame member 12 in a conventional manner. Steering wheel unit 10 serves as forward ground engaging means for the cutter unit 13 while the rear traction wheels 11 serve as a rearward ground engaging means for the cutter unit 13. In this embodiment, the forward and rearward wheels for height adjustment purposes are relatively fixed, but it will be understood that, as described in my application Serial No. 234,468, the forward wheel unit 10 and the rearward wheel unit 11 are articulately coupled together by frame member 12, there being a pivotal connection of the frame member 12 at the traction unit 11 by means of saddle 14.

Mower unit 13 is positioned between the forward wheel unit 10 and the rear wheel unit 11 and has welded on its upper deck surface 16 a pair of opposed channel members 17 and 18 (FIG. 1). The mower unit includes a conventional vertical shaft S having a sheave 19 on one end thereof above the upper deck surface 16 of the cutting unit, and a cutting blade 20 on the lower end within the mowing unit housing 13a. Sheave 19 is drivingly coupled by a driving pulley (not shown) on the engine (not shown) mounted on the rear wheel unit 11 by means of an endless flexible belt 21 which may be tightened by means of a conventional belt tightener comprising an idler pulley 22 rotatably mounted on the end of clutch arm 23. Clutch arm 23 is pivotable about spindle shaft S by a clutch handle 24 which extends through a slot 26 in channel member 18 and is latched in an engaged or disengaged position by a latch mechanism (not shown). The drive mechanism for the cutter blade 20 is merely exemplary in this embodiment since a separate motive means, such as a separate drive engine, may be mounted directly on the upper deck 16 of mower unit 13.

Transverse bearing bar 27 is journaled at 28 and 29 in channel members 17 and 18, respectively. A pair of forwardly extending long arms 30 and 31 are rigidly secured to transverse bearing bar 27, and are rigidly connected together by a cross bar 32. The forward ends of arms 31 are rigid with a further cross bar 33, and the lateral ends 34 and 36 of cross bar 33 are journaled at 37 and 38, respectively, and to frame member 39 on forward wheel unit 10. Thus, movements of transverse bearing bar 27 relative to front wheel unit 10 are along an arc A1 with transverse bar 33 being the axis thereof. Furthermore, oscillatory movements of the front wheel unit 10 about the longitudinal axis of the tractor are transmitted directly to the cutter unit 13 through arms 30 and 31.

Rigid with, and depending downwardly from transverse bearing bar 27 is a short arm 40, which, preferably, is at an angle of about 90° to the long arms 30 and 31 so that the latter and short arm 40 form a forward bell crank lever. Rear transverse bearing bar 41 is pivotally mounted at its ends 42 and 43 in the rear ends of channel members 17 and 18, respectively. Rigid with transverse bearing bar 41 are a pair of second long arms 44 and 46 which extend rearwardly of transverse bearing bar 41. An upstanding short arm 47 is likewise rigid with transverse bearing bar 41 and forms with arms 44 and 46 a rearward bell crank lever. Upstanding arm 47 of the rearward bell crank lever and depending arm 40 of the forward bell crank lever are connected by intermediate link 48 which link guidingly constrains the movements of the arms in opposite directions. Intermediate link 48 is pivotally connected at 49 and 50 to the arms 47 and 40, respectively.

The rear ends of arms 44 and 46 are coupled to the rear ground engaging means or unit 11 by flexible link suspension means 50 and 51. As more fully shown and described in my application Serial No. 234,468, when the forward and rearward bell crank levers are latched against movement, this suspension serves as a four-point suspension (at pivots 34 and 36 and chains 50 and 51) during operation on level terrain. However, when the front wheel unit is at a different angular orientation relative to the longitudinal axis of the tractor than the rear traction unit 11, the suspension shifts from a four-point suspension to a three-point suspension and there is an automatic anticipatory elevating movement of the rear edge of the cutter unit 13.

As thus far described, the mower unit 13 would rest at its lowest position or on the ground since the linkage chain comprising long arms 30-31, short arm 40, intermediate link 48, short arm 47 and long arms 44 and 46 is not latched. If any one of the rigid links of the linkage chain were latched against movement, the linkage system would hold the mower housing 13a at a selected location intermediate the ground surface and tubular frame member 12. The present invention provides a rapidly adjustable mechanism for holding the cutter mower unit housing 13a at a selected horizontal position above the ground surface.

In a preferred embodiment of the present invention, the linkage is latched by the provision of further arms 51 and 52 which are integral with the rearward bell crank levers consisting of long arms 44 and 46 and short arm 47. Arms 51 and 52 carry studs 53 and 54, respectively. A pair of laterally spaced scalloped cams 56 and 57 are secured to a transverse bar 58 having an extension 59 which serves as an operating handle or lever. Transverse bar 58 is parallel to transverse bar 41 and is likewise journaled in channel members 17 and 18 at 60 and 60', respectively.

It will be understood that a single scalloped cam may be used in place of the disclosed pair of cams 56 and 57. These cams are identical. Each notch or scallop 61-1, 61-2, etc., in cams 56 and 57 is at a different effective radius from the axis (transverse bar 41) of the cams so that as the cams are moved about their axes, studs 53 and 54 are cammed in an arc about the axis of transverse bar 41. Since studs 53 and 54 are rigid with arms 51 and 52 of the rearward bell crank system, these bell cranks are therefore rotated about the axis of transverse bar 41. The rearward ends of link arms 41 and 46 are prevented from downward movement by their connection to the traction unit and the axis of transverse bar 41 is constrained to move in an upward direction along an arc having as their center thereof the connection of rearwardly extending arms 44 and 46 to the downwardly depending chains 50 and 51. (There is a slight movement of the rearward end of arms 44 and 46 in a forward direction but this movement is very small and for purposes of this invention may be considered to be negligible, the main concern being the upward movement of transverse bearing bar 41.) The rotation of arm 47 is coupled by means of intermediate link 48 to the short arm 40 to effect movement (in an opposite clock direction) of this arm about transverse bearing bar 29. Since downward and upward movement of arms 30 and 31 is prevented by their connections to front wheel frame member 39, there is an upward or downward movement of bar 29 about an arc $A_1$ identical to the movement of bar 41. Thus arm pairs 44–46 and 30–31 are caused to rotate in opposite directions to cause raising and lowering of the mower unit housing 13a.

It should be noted that the effective lengths of forward arms 30–31 and rearward arms 44–46 are substantially equal and that the arms are substantially horizontal in the normal cutting height position. The distance between transverse cross bar 33 and transverse bearing bar 29 is the radius of movement of the latter about the axis of the former. Thus, the front end of the mower unit housing 13a must move along arc $A_1$ about transverse bar 33 with the radius of the arc being equal to the effective length of the arms 30–31. Therefore, above and below the normal cutting height, the cutter unit is shifted forwardly a slight amount and, since the arms 30–31 are substantially horizontal in their normal position, the amount of shift is negligible. The flexible link suspension 51 and 50 permits the slight forward shifting of the cutting unit housing 13a. In addition, rotation of arms 44 and 46 about the axis of transverse bearing bar 41 forces the axis of this bar to move along an arc which is shifted a longitudinal distance corresponding to the shifting movement of the transverse bearing bar 29 in a longitudinal direction.

It will be noted that the points of suspension of the cutter unit 13 are at the rearmost ends of arms 44 and 46 and the forward ends of arms 30 and 31. The weight of the cutter unit acts directly at transverse bar 41 and at transverse bar 29, tending to rotate arms 44 and 46 in a clockwise direction about the rearmost ends of arms 44 and 46 while tending to cause arms 30 and 31 to rotate in a counterclockwise direction about transverse bar 33. The force tending to rotate arms 30 and 31 also rotates short arm 40, and this force is transmitted through intermediate link 48 to augment the force tending to rotate rear arms 44 and 46 about transverse bar 41. These forces are cumulatively added and applied to studs 53 and 54 to bias the same downwardly into the scallops 61 of cams 56 and 57. Thus, the only force required for maintaining studs 53 and 54 in engagement with their respective scallops on cams 56 and 57 is the weight of the cutter unit itself and any mechanical advantage derived from the linkage system.

In this manner, lugs or studs 53 and 54 are urged into their respective scalloped portions of the camming surfaces on cams 56 and 57 to latch the cutter unit at a fixed distance relative to the ground and completely avoid the necessity for latches, ratchets, etc.

It will be apparent that when either the front transverse bearing bar 27 or the rear transverse bearing bar 41 is unloaded, as for example when an obstruction or large stone is engaged by the forward end of the housing or a skid member attached thereto and the mower unit housing 13a is elevated slightly, cams 56 and 57 will be disengaged from studs 53 and 54 and operating handle 59 will fall forwardly to where the scallops on the cams next engaged by the studs 53 and 54 will be in the lowermost position. Thereafter, without more, the cutter unit housing 13a would be at the lowest position of height adjustment and the lowest cut possible would be achieved.

It is desirable, after passing such an obstruction as just described, that the cutter unit is effectively at the next highest position possible or just at the height at which the obstruction raises the cutter housing 13a. To accomplish this, a torsion spring 70 is mounted concentric with transverse bar 58 and loaded so as to cause operating lever 59, cams 56 and 57, and transverse bar 58 to be rotated in a counterclockwise, or "up," direction so that after the obstruction is passed the cutter unit is at the next highest elevation. Thus end 71 of torsion spring 70 is hooked on transverse bar 41 while end 72 is hooked on pin 73 passing through cam hub 74 on cam bar 58. The torsion spring 70 tends to rotate operating lever 59 and cams 56 and 57 in a clockwise direction towards studs 53 and 54 to aid in maintaining the studs 53 and 54 in the scallops 61 and preventing accidental change in the cutting height.

The cam height adjustment mechanism of the present invention may also be employed where the cutter units per se is supported entirely by ground engaging wheels or the like as, for example, in a manually guided mower of the type as shown in FIGS. 4 and 4a. In these figures, similar parts having structure and function are identified with prime numerals corresponding to the parts shown in FIGS. 1 and 2.

Referring to FIGS. 4 and 4a, a single, centralized scalloped cam 80 is shown as pivotally mounted at 81 on bracket 71 on the upper deck 16' of the cutter housing 13'. Rear transverse bar 41' is rotatably mounted at its ends in support brackets 72 (only one shown) mounted on the upper deck 16' of the housing 13'. Front transverse bar 27' is similarly mounted in brackets 73 on deck 16'. Downwardly extending front wheel arms 76 are mounted on transverse bar 41' for rotary movement therewith; and downwardly extending front wheel arms 77 are mounted on transverse bar 27' for rotary movement therewith. Wheels 78 are rotatably mounted on stub axle 79 at the ends of wheel arms 76 and 77. Short arm 47', rigid with transverse bar 41', is connected to short arm 40' by intermediate link 48' so that the forward wheel arms 77 and rear wheel arms 77 and rear wheel arms 76 are constrained to move simultaneously equal amounts but in opposite rotary directions. Also rigid with transverse bar 41' is a further arm 84 having mounted in the end thereof a cam pin 85 engageable with a scallop of the camming surface 87 of cam 80. A tension spring 88 is connected between arm 84 and the housing 13' to augment the effect of the weight of the cutter unit in maintaining a given height adjustment.

In this embodiment, operation of the height adjust handle 82 moves cam 80 and its camming surface 87 about the axis pivot pin 81. This rotary movement cams cam pin 85 upwardly or downwardly into different ones of the scallops on camming surface 87 so as to move cam pin 85 to different distances from the rotary axis of cam 80 according to the radius of each scallop of cam 80. In this instance, the rearward wheel arms 76, on elevating the height of the cutter unit, rotate in a counterclockwise direction about transverse bearing bar 41' while forward arms 77 rotate in an opposite direction, namely, in a clockwise direction about transverse bearing bar 27'. Conversely, on lowering of the cutter unit, forward arms 77 are rotated in a counterclockwise direction while the rearward arms 76 are rotated in a clockwise direction.

Figure 5:
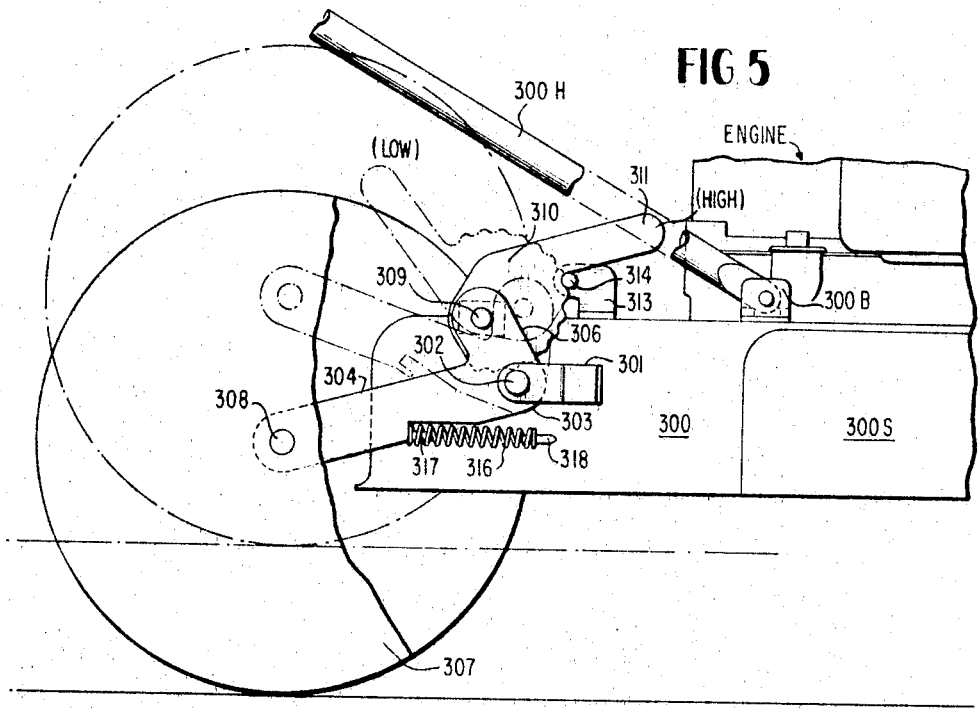
FIG. 5 is a partial elevational view of a further modification of the invention as it is applied to a push-type lawn mower wherein a separate cam mechanism is applied to all the wheels thereof.
Figure 6:
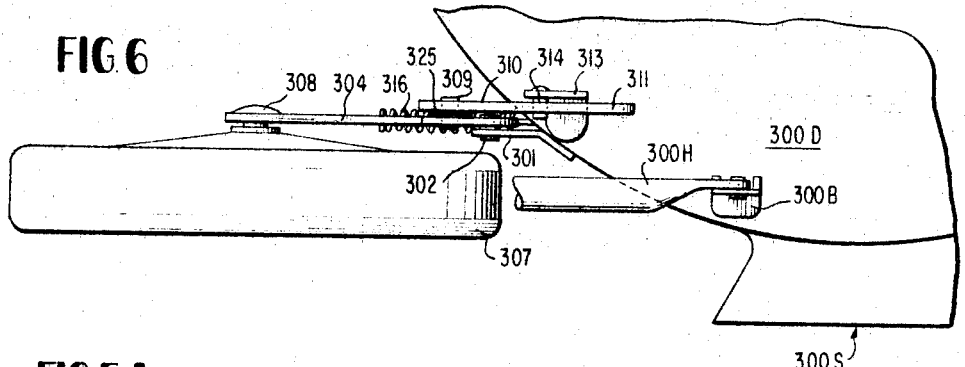
FIG. 6 is a partial top plan view of the mechanism shown in FIG. 5.

Referring now to FIGS. 5 and 6, the invention is shown as applied to a walking attendant-guided rotary lawn mower having a pan-shaped deck or housing 300 of conventional design with an outlet chute 300S for grass clippings. An internal combustion engine may be mounted on the upper deck surface 300D and drivingly coupled to a rotary blade cutter (not shown). Also mounted on the housing 300 is a handle 300H pivotally attached to brackets 300B at either side thereof, brackets 300B having the conventional stop lugs thereon to maintain the operating handle 300H in an upwardly inclined position as is conventional.

At each wheel position on the housing 300 are brackets 301 which are welded or otherwise secured to a side of the housing 300. Bell crank lever 303 is fulcrumed on a pivot pin 302 at an end of bracket 301. Bell crank lever 303 has a wheel arm 304 and a cam arm 306. Wheel 307 is journaled on a stub axle 308 at the lower end of wheel arm 304 in a conventional manner. A bearing pin 309 in the cam arm 306 has pivotally mounted thereon scalloped cam 310.

Figure 5A:
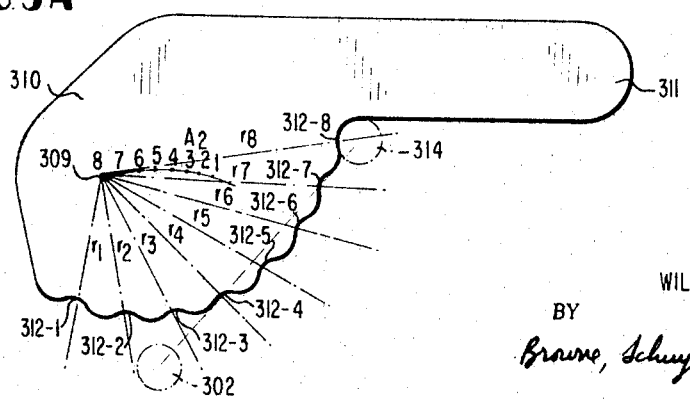
FIG. 5A is an enlarged view of the eccentric cam shown in FIG. 5.

Scalloped cam 310, shown in enlarged detail in FIG. 5A, is a flat plate body member having integral therewith cam handle 311. Formed on the cam body member 310 is a camming surface 312 which includes a series of scallops 312–1, 312–2 through 312–8, each scallop being at a different radius $r_1, r_2 \ldots r_8$, respectively, from the rotary axis (pin 309) of the cam.

On the upper deck surface 300D of housing 300 is a stud bracket 313 having a cam pin or stud 314 mounted therein. Pin 314 may be a roller surface or, preferably, is merely a hardened steel pin or rod as shown. As thus shown, the reaction of the wheel on the ground surface to the weight of the housing and engine, is in a clockwise direction (as shown in FIG. 5) tending to rotate the wheel arm 304 in the same direction. The cam arm 306 of bell crank 303 and the cam 310 which is mounted on pin 309 in the cam arm 306 are likewise rotated in the same direction. Thus, the camming surface 312 is urged into engagement with the stud pin 314 and, depending upon which of the scallops 312–1 etc. is in engagement with cam 314, the height of the cutter unit itself above ground is thus established. Rotation of cam handle 311 about its pivot point 309, through camming action, forces bell crank 303 to rotate about its pivotal mounting 302 on bracket 301.

It should be noted that the portion of the housing 300 between the stud pin 314 and bearing pin 302 forms a link rigid therewith, while the fulcrum point 302, common with said first link, is likewise a part of an end of a link which consists of the cam arm 306, namely, the portion of the cam arm between the axial center of the fulcrum 302 and the axial center of bearing pin 309. The distance between the cam 309 and the stud cam 314 is a variable link and the length of the link is determined by the scallopation on the cam 310 in which the cam pin 314 rests. The radii $r_1, r_2, r_3$, etc. are of different lengths, so that the positions of cam pin 314 (and the cam arm 306) along an arc $A_2$ having as a radius the length of link 302–309 consist of the points 1, 2, 3, 4, 5, 6, 7, 8, corresponding respectively to the scallopations 312–1, 312–2, etc. on the camming surface. Thus, wheel arm 304 is moved in an arc relative to fulcrum point 302 to vary the relative position between the ground engaging tread of wheel 307 and housing 300 in a vertical direction, and thus adjust the height of the cutter unit above the ground.

In order to more fully make clear my invention, I wish it to be understood that the main point of novelty involved in this embodiment is the use of the camming surface 312 on cam 310 to effect a variable triangulation. The prior art mentioned earlier in this specification utilizes an arrangement wherein the points designated along the arc 1, 2, 3, 4, 5, 6, 7, 8, are established by a toothed quadrant with a latched mechanism on a structure closely corresponding to my cam arm 306. Thus, the cam 310 is, in itself, a highly useful article of manufacture in the rotary lawn mower art.

In my application Serial No. 234,468, where the invention was applied to a cutter assembly which has suspended from a riding tractor, the passage of the ground wheels of that structure over a low spot, for example, did not directly effect the engagement of the camming surface with its associated stud pin.

In order to maintain the engagement of the scallop of the camming surface 312 with the cam pin 314 a compression spring is provided between the wheel arm 304 and a portion of the housing 300. Specifically, wheel arm 304 is provided with a projection 317 over which one end of compression spring is fitted. A similar projection or stud 318 integral with the housing 300 is fitted into the other end of compression spring 316, thereby causing spring 316 to be loaded to urge wheel arm 304 in a clockwise direction. Thus, when wheel 307 is not providing any reaction force on cam 308 to rotate wheel arm 304 in a clockwise direction, this force is provided by spring 316 to maintain the scallopation on the cam surface 312 in engagement with the pin 314.

As will appear more fully hereinafter, this spring can be eliminated if a friction device such as a friction washer 325 is added between the cam arm 306 and the cam body 310 to prevent inadvertent rotation of the cam by vibration or wheel 307 passing over a low spot, etc.

It will be appreciated that if the linkage arrangement disclosed in connection with the embodiment of FIG. 4 were to be utilized in this arrangement, then there need only be one adjustment of the cam mechanism to simultaneously adjust all four wheels of the mower unit. Furthermore, the cam may be rotatably mounted on the deck 300D and cooperating cam pin 314 may be mounted on the arm 306. Moreover, the spring 316 may be applied between cam arm 306 and a part of the housing 300.

In FIGS. 7 and 8, which disclose a front wheel arrangement, the height adjust cam pivots about a fixed point on the mower deck and the cam pin is attached to the wheel lever. Specifically, the housing 400 has welded or otherwise affixed thereto a mounting bracket 401 which as an arm 401A extending forwardly and parallel to the longitudinal axis of the mower. Bracket arm 401 has a pivot pin 402 on which is pivoted wheel lever 403 which extends downwardly and rearwardly of pivot pin 402. Wheel 407 is journaled on a stub axle 408 at the rear end of wheel lever 403.

Eccentric cam 410 is pivotally mounted at the upper end of bracket arm 401A on a pivot pin 409. This cam includes an operating handle 411 and a camming surface 412 having scallops 412–1 through 412–8. In this instance, it will be noted that the camming surface has been rotated about the axis of pivot 409 so that it faces substantially downwardly. A stud or cam pin 414 is on the wheel lever 403, intermediate the ends of said lever and between fulcrum point 402 and axle 408. The camming surface 412 engages cam pin 414, and this engagement is maintained in part by the reaction force of the wheel 407 tending to rotate wheel lever 403 in a counterclockwise direction.

It will be noted, as in the embodiments described earlier herein, that the portion of bracket 401 between pivot pin 409 and pivot pin 402 forms a rigid link, and that the portion of wheel lever 403 between the pivot pin 402 and the cam pin 414 forms a second link, the two said links having the pin 402 as a common point. Between cam pivot 409 and cam pin 414 is interposed the adjustment mechanism comprising the cam 410 which is a variable link so that the triangle formed by pivot pin 402, cam pin 414, is a variable triangulation with the side 409–414 being variable in accordance with the position of the cam.

A compression spring 416 is interposed between wheel lever 403 and housing 414 to urge the wheel lever 403 in a counterclockwise direction to force cam pin 414 to bear onto one of the scallops of the cam surface 412. Spring 416 is fitted on a projection 417 on the wheel lever 403, and the opposite end thereof is fitted on a further projection 418 rigid with housing 400. Thus, inadvertent shifting of cam pin 414 into other scallops on the camming surface 412 due to vibration or the wheel passing over a low spot is avoided. A friction device 420, which may be a wavey spring washer, is interposed between the facing surfaces of the bracket arm 401A and the cam body 410 to prevent inadvertent rotation of the eccentric cam 410 by vibration of the wheel passing over a low spot etc. If desired, spring 416 may be omitted, in which case the wheel lever 403 would tend to rotate in a downward direction when passing over a hole, for example. In this instance, the friction device 420 prevents rotation of the cam 412 so that when the hole is passed wheel 407 returns the wheel lever 403 and the cam pin 414 back into engagement with the camming surface 412 at the same position of adjustment that the cam was in prior to encountering the hole in the ground.

It will be appreciated that instead of having a separate cam at each of the four wheels, only one cam may be used, in which case a linkage mechanism as described earlier herein would be utilized for translating the cam operation to all of the wheels of the mower unit. Alternatively, two cams could be used, one at the front and the other at the rear end of the cutter unit, each cam being located proximate the center line of the mower unit with the cam pin consisting simply of a cross-bar between the wheel levers.

While preferred forms of the apparatus have been described herein, it is to be understood that this invention is not limited to this precise form of apparatus and that changes may be made therein without departing from the scope of the invention which is defined in the appended claims.

I claim:

1. In a power mower having forward and rearward ground engaging wheels, a linkage system interconnecting said forward and rearward ground engaging wheels and a cutter unit assembly suspended from said linkage system; said linkage system comprising:
   a forward bell crank lever having a first arm pair extending forwardly of said housing with the forward wheel means being mounted on the forward end of said first arm pair,
   a short arm extending at an angle from said first arm pair,
   a rearward bell crank lever having a second arm pair, extending rearwardly of the cutter unit, said rear wheel means being mounted on the rearwardly extending ends of said second arm pair,
   a second short arm rigid with said second arm pair and extending at an angle therefrom in a direction opposite to the direction in which said first short arm extends,
   an intermediate link interconnecting the short arms of said forward and rearward bell crank levers,
   said cutter unit assembly normally constraining said linkage system to cause said forward and said rearward wheels to move away from each other along the longitudinal axis of the cutter unit,
   cam means between said linkage system and said cutter unit for restraining longitudinal movements of said wheel means relative to said cutter unit assembly,
   said cam comprising an eccentric scalloped cam pivotally mounted on said cutter unit, each scallop of said cam having an effectively different radius from the pivotal mounting of said sam on the housing,
   a third arm on one of said bell crank levers cooperatively associated with said cam for engagement with one of the scallops on said cam,
   and means for rotating said scalloped cam to move a different one of the scallops thereon into cooperative association with said third arm and effect clockwise rotation of one of said bell crank levers in counterclockwise rotation of the other of said bell crank levers to thus adjust the height of the cutting unit above ground.

2. The apparatus defined in claim 1 wherein said third arm of said bell crank lever is maintained in a cooperative association with a scallop on said scalloped cam by the weight of said mower unit.

3. A structural arrangement for supporting a mower cutter unit with respect to the ground surface so that the height of the cutter unit with respect to the ground surface may be adjusted quickly and easily, said structural arrangement comprising:
   at least one pair of oppositely disposed spaced apart bell crank levers,
   each bell crank lever of said pair being pivotally mounted on said cutter unit,
   an intermediate link extending between and pivotally connected to an arm of each of said bell crank levers so that when one of said bell crank arms moves in one clock direction said intermediate link causes the corresponding arm of the other bell crank to which it is connected to move in an opposite clock direction,
   means for supporting the other arms of said bell crank levers so that the weight of said cutter unit exerts a downward pull on said bell crank levers and the pivotal connections thereof to said cutter unit,
   eccentric cam means positioned on said cutter unit between the pivotal connections of said bell crank levers to said cutter unit,
   said eccentric cam means being connected to said cutter unit to permit movement of said cam means with respect to said cutter unit,
   means extending from one of said bell crank levers and engaging said eccentric cam means to maintain said cutter unit above the ground surface over which the mower travels,
   said eccentric cam and cam engaging means being constructed and arranged so that the movement of said cam with respect to said cutter unit either increases or decreases the height of the cutter unit with respect to the ground surface depending upon the direction of movement of the said eccentric cam means, and the weight of the cutter unit acts constantly to maintain the cam in engagement with said means extending from one of said levers.

4. A structural arrangement according to claim 3 wherein said eccentric cam means is a pivotally mounted cam having a scalloped camming surface,
   and said cam engaging means includes a stud seatable in any one of the scallops in said camming surface.

5. In a structural arrangement for supporting a rotary blade cutter unit from a riding tractor having forward and rearward wheels so that the height of the cutter unit above the ground surface may be adjusted quickly and easily,
   an adjustable linkage system supporting said cutter unit in depending relation thereto between the forward and rearward wheels of said riding tractor,
   said adjustable linkage system including an eccentric cam member operating between said linkage and said cutter unit for changing the height of the cutter unit above the ground surface, said cam member having a camming surface comprising a plurality of scallops, each such scallop running smoothly into the next one and each scallop having a successively larger eccentricity than the one preceding it,
   and an operating handle to adjust the relative position of said cam member with respect to said cutter unit to adjust said linkage system to thereby vary the height of said cutter unit assembly from ground surface,
   said linkage system being so arranged that the weight of the cutter unit at least in part maintains the adjustment of said linkage to maintain the cutter at a given height.

6. In a riding power lawn mower having rotary blade cutter unit and an operator carrying ground-engaging tractor unit for supporting the cutter unit above ground,
   adjustable linkage means supporting said rotary blade cutter unit from said tractor means so that said rotary blade cutter means is supported above ground thereby,
   said adjustable linkage supporting said cutter unit between forward and rearward wheels of said tractor means including a pair of transversely spaced pivots on said tractor unit supporting the forward terminal end of said linkage means and a pair of transversely spaced pivots depending from said tractor unit supporting the rearward terminal end of said linkage means, said adjustable linkage further including eccentric cam means having camming surfaces thereon, said camming surfaces comprising a plurality of scallops, each scallop running smoothly into the next one and having a larger eccentricity than adjacent ones, said cam means being mounted on one of said units with at least one of said camming surfaces in engagement with a cam engaging member on the other of said units, and an operating handle extending upwardly from said cutter unit to within easy grasp of the operator of the tractor for effecting relative movement between said camming surfaces and the cam engaging member on the other of said units with which said cam means is engaged to thereby adjust said adjustable linkage and change the vertical position of said cutter unit with respect to said ground-engaging tractor unit.

References Cited by the Examiner

UNITED STATES PATENTS

| | | | |
|---|---|---|---|
| 382,101 | 5/1888 | McKnight | 74—107 |
| 1,582,629 | 4/1926 | Riebel | 280—25.4 |
| 1,803,160 | 4/1931 | Adams | 56—25.4 |
| 2,154,564 | 5/1939 | Eisenlohr | 56—25.4 |
| 2,568,822 | 9/1951 | Pervis | 56—25.4 |
| 2,741,488 | 4/1956 | Ripple | 280—43.17 |
| 3,161,006 | 12/1964 | Willette et al. | 56—25.4 |

FOREIGN PATENTS 206,240   2/1957   Australia.

ABRAHAM G. STONE, *Primary Examiner.*

RUSSELL R. KINSEY, *Examiner.*

M. C. PAYDEN, *Assistant Examiner.*